(12) United States Patent
Yamada et al.

(10) Patent No.: US 8,305,258 B2
(45) Date of Patent: Nov. 6, 2012

(54) RADAR DEVICE

(75) Inventors: Naoyuki Yamada, Aichi-gun (JP);
Toshiaki Watanabe, Owariasahi (JP);
Makoto Nakai, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/336,296

(22) Filed: Dec. 23, 2011

(65) Prior Publication Data

US 2012/0119937 A1    May 17, 2012

Related U.S. Application Data

(63) Continuation of application No. PCT/JP2009/004083, filed on Aug. 25, 2009.

(30) Foreign Application Priority Data

Jul. 29, 2009    (JP) ................................. 2009-176630

(51) Int. Cl.
*G01S 13/08* (2006.01)
(52) U.S. Cl. ......... 342/123; 342/127; 342/133; 342/146
(58) Field of Classification Search .................... 342/123
See application file for complete search history.

(56) References Cited

U.S. PATENT DOCUMENTS

| | | | |
|---|---|---|---|
| 6,246,365 B1 | 6/2001 | Tokoro | |
| 2004/0246167 A1 | 12/2004 | Kumon et al. | |
| 2007/0273576 A1* | 11/2007 | Struckman et al. | 342/156 |
| 2009/0245411 A1* | 10/2009 | Goldberg | 375/267 |

FOREIGN PATENT DOCUMENTS

| | | |
|---|---|---|
| JP | 11-287857 | 10/1999 |
| JP | 2000-28714 A | 1/2000 |
| JP | 2001-166029 A | 6/2001 |
| JP | 2004-191131 A | 7/2004 |
| JP | 2004-226121 A | 8/2004 |

OTHER PUBLICATIONS

International Search Report mailed on Nov. 24, 2009, issued for International Application No. PCT/JP2009/004083, filed Aug. 25, 2009 (with English Translation).
International Written Opinion mailed on Nov. 24, 2009 for International Application No. PCT/JP2009/004083, filed Aug. 25, 2009.
International Preliminary Report on Patentability mailed on Aug. 11, 2010 for International Application No. PCT/JP2009/004083, filed Aug. 25, 2009.

* cited by examiner

*Primary Examiner* — Timothy A Brainard
(74) *Attorney, Agent, or Firm* — Oblon, Spivak, McClelland, Maier & Neustadt, L.L.P.

(57) ABSTRACT

A radar device includes: a receive antenna having a plurality of element antennas disposed in the left-right direction such that at least some of the plurality of element antennas is shifted in the up-down direction from the others; and a position detecting ECU. The position detecting ECU Includes: a first position detecting section, which detects a position of an object in the up-down direction, based on a phase difference between the respective reception signals received by the plurality of element antennas; and a first position correcting section which corrects the position in the up-down direction, based on the history of the position in the up-down direction, and obtains a first corrected position which is a position in the up-down direction after the correction.

16 Claims, 8 Drawing Sheets

RADAR DEVICE

TECHNICAL FIELD

The present invention relates to a radar device, which is, for example, mounted in a vehicle, for detecting a position in the up-down direction of an object present around the vehicle. The present invention also relates to a radar device, which is, for example, mounted in a vehicle, for detecting a position in the left-right direction of an object present around the vehicle.

BACKGROUND ART

Car radar devices are often used for recognizing a preceding vehicle or the like traveling, in which case, it is necessary to distinguish, from the preceding vehicle, objects, such as road signs and guideboards, which may not be obstacles due to their high positioning in the vertical direction relative to the road surface.

In order to overcome such problem, various methods, apparatuses, and the like are disclosed (for example, see Patent Literature 1). A radar device disclosed in Patent Literature 1 includes a receive antenna having an array antenna in which a plurality of element antennas are disposed in the left-right direction and a signal processor which electrically scans the antenna pattern of the receive antenna in the left-right direction to recognize objects present within a predetermined azimuth range in the left-right direction, based on a reception signal received by the receive antenna. In the radar device, at least some of the element antennas is disposed being shifted in the up-down direction from the others, and the signal processor uses a reception signal from the element antennas shifted in the up-down direction from the others to detect an object position in the up-down direction by the monopulse method.

According to the radar device disclosed in Patent Literature 1, by shifting in the up-down direction some of the plurality of element antennas, which are included in the receive antenna and disposed in the left-right direction, from the others, or providing the element antennas disposed in the up-down direction separately from the element antennas disposed in the left-right direction, the object position in the up-down direction can be detected within a desired angular range. That is, an amount of shift in the up-down direction or the disposition interval in the up-down direction can be set to be small as necessary. Therefore, a sufficient angular range for detection in the up-down direction can be provided.

CITATION LIST

Patent Literature

Patent Literature 1: Japanese Laid-Open Patent Publication No. H11-287857

SUMMARY OF THE INVENTION

Problems to be Solved by the Invention

The radar device disclosed in Patent Literature 1, however, may not be able to correctly detect the object position in the up-down direction due to the effect of the road surface reflection. That is, a reflected wave from one object includes a reflected wave, which reflected from the road surface, and received by the radar device. Because of this, the object position in the up-down direction may not be correctly detected due to the effect of the reflected wave.

Not only the object position in the up-down direction, the object position in the left-right direction also may not be correctly detected in the case where reflected waves from side walls on an expressway or the like or from side walls or the like in a tunnel are received by the radar device.

The present invention is made in view of the circumstances described above, and an object of the present invention is to provide a radar device capable of accurate detection of at least one of the respective object positions in the left-right and up-down directions.

Solution to the Problems

In order to achieve the above object, the present invention has the following features. A first aspect of the present invention is a radar device, which is mounted in a vehicle, for detecting a position, in the up-down direction, of an object present around the vehicle, the radar device including: a receive antenna having a plurality of element antennas which are disposed in the left-right direction such that at least some of the plurality of element antennas are shifted in the up-down direction from the others; first position detector for detecting the position of the object in the up-down direction, based on a phase difference between respective reception signals received by the plurality of element antennas; and first position corrector for correcting the position in the up-down direction, based on a history of variation of the position in the up-down direction, and obtaining a first corrected position, which is a position in the up-down direction after the correction, the variation being caused by reflected waves, which are generated by a radar wave being reflected by the object, arriving at the receive antenna through a plurality of paths including a road surface reflection path and a synthesized wave of the reflected waves which arrived through the plurality of paths being received at the receive antenna.

In a second aspect of the present invention based on the first aspect, the first position corrector obtains a substantially uppermost position as the first corrected position, among positions in the up-down direction which have been detected within a previously set predetermined time period.

In a third aspect of the present invention based on the first aspect, the first position corrector obtains a first average value, which is an average value of positions in the up-down direction which have been detected within a previously set predetermined time period, and first distribution, which is distribution of the positions in the up-down direction within the previously set predetermined time period, and obtains the first corrected position, based on the obtained first average value and the obtained first distribution.

In a fourth aspect of the present invention based on the third aspect, the first position corrector obtains the first corrected position by adding, to the first average value, a product which is obtained by multiplying the first distribution by a first predetermined number, which is previously set, that is equal to or greater than 1.

In a fifth aspect of the present invention based on the fourth aspect, the first predetermined number is set to be equal to or greater than 2 and equal to or less than 4.

In a sixth aspect of the present invention based on the first aspect, the radar device includes first characteristic estimator for estimating a first reflectance characteristic of a radio wave transmitted from the radar device, the first reflectance characteristic being a reflectance characteristic in a road surface on which the vehicle travels, wherein the first position corrector obtains the first corrected position, based on the first reflectance characteristic estimated by the first characteristic estimator.

In a seventh aspect of the present invention based on the sixth aspect, the radar device includes first image generator for generating image information on the road surface on which the vehicle travels, wherein the first characteristic estimator estimates the first reflectance characteristic, based on the image information, on the road surface, which is generated by the first image generator.

In an eighth aspect of the present invention based on the first aspect, the radar device includes: second position detector for obtaining a position of the object in the left-right direction, based on the phase difference between the respective reception signals received by the plurality of element antennas; and second position corrector for correcting the position, in the left-right direction, which is obtained by the second position detector, based on a history of the position, in the left-right direction, which is obtained by the second position detector, and obtaining a second corrected position, which is a position in the left-right direction after the correction.

A ninth aspect of the present invention is a radar device, which is mounted in a vehicle, for detecting a position, in the left-right direction, of an object present around the vehicle, the radar device including: a receive antenna having a plurality of element antennas disposed in the left-right direction; second position detector for obtaining the position of the object in the left-right direction, based on a phase difference between respective reception signals received by the plurality of element antennas; and second position corrector for correcting the position in the left-right direction, which is obtained by the second position detector, based on a history of variation of the position in the left-right direction, which is obtained by the second position detector, and obtaining a second corrected position, which is a position in the left-right direction after the correction, the variation being caused by reflected waves, which are generated by a radar wave being reflected by the object, arriving at the receive antenna through a plurality of paths including a side wall reflection path and a synthesized wave of the reflected waves which arrived through the plurality of paths being received at the receive antenna.

In a tenth aspect of the present invention based on the ninth aspect, the second position corrector obtains a substantially frontmost position as the second corrected position, among positions, in the left-right direction which have been detected within a previously set predetermined time period.

In an eleventh aspect of the present invention based on the ninth aspect, the second position corrector obtains a second average value, which is an average value of positions in the left-right direction which have been detected within the previously set predetermined time period, and second distribution, which is distribution of the positions in the left-right direction within the previously set predetermined time period, and obtains the second corrected position, based on the obtained second average value and the obtained second distribution.

In a twelfth aspect of the present invention based on the eleventh aspect, the second position corrector obtains the second corrected position by subtracting from the second average value a product which is obtained by multiplying the second distribution by a second predetermined number, which is previously set, that is equal to or greater than 1.

In a thirteenth aspect of the present invention based on the twelfth aspect, the second predetermined number is set to be equal to or greater than 2 and equal to or less than 4.

In a fourteenth aspect of the present invention based on the ninth aspect, the radar device includes second characteristic estimator for estimating a second reflectance characteristic of a radio wave transmitted from the radar device, the second reflectance characteristic being a reflectance characteristic in a side wall on a road on which the vehicle travels, wherein the second position corrector obtains the second corrected position, based on the second reflectance characteristic estimated by the second characteristic estimator.

In a fifteenth aspect of the present invention based on the fourteenth aspect, the radar device includes second image generator for generating image information on the side wall on the road on which the vehicle travels, wherein the second characteristic estimator estimates the second reflectance characteristic, based on the image information, on the side wall, which is generated by the second image generator.

In a sixteenth aspect of the present invention based on the ninth aspect, the plurality of element antennas are disposed such that at least some of the plurality of element antennas are shifted in the up-down direction from the others, the radar device including: first position detector for obtaining a position of the object in the up-down direction, based on the phase difference between the respective reception signals received by the plurality of element antennas; and first position corrector for correcting the position in the up-down direction, based on a history of variation of the position in the up-down direction, and obtaining a first corrected position, which is a position in the up-down direction after the correction, the variation being caused by reflected waves, which are generated by a radar wave being reflected by the object, arriving at the receive antenna through a plurality of paths including a road surface reflection path and a synthesized wave of the reflected waves which arrived through the plurality of paths being received at the receive antenna.

Advantageous Effects of the Invention

According to the first aspect, the receive antenna is disposed in the left-right direction, and includes the plurality of element antennas in which at least some of the plurality of element antennas is disposed so as to be shifted in the up-down direction from the others. The object position in the up-down direction is detected based on the phase difference between respective reception signals received by the plurality of element antennas. Furthermore, the position in the up-down direction is corrected based on the history of the position in the up-down direction, and the first corrected position, which is a position in the up-down direction after the correction, is obtained. Thus, the object position in the up-down direction can be accurately detected.

That is, by shifting in the up-down direction some of the plurality of element antennas, which are included in the receive antenna and disposed in the left-right direction, from the others, the object position in the up-down direction can be detected based on the phase difference between the respective reception signals received by the plurality of element antennas. Also, the position in the up-down direction is corrected based on the history of the obtained positions in the up-down direction, and thereby the first corrected position which is a position in the up-down direction after the correction is obtained. Therefore, the object position in the up-down direction can be accurately detected.

According to the second aspect, among the positions in the up-down direction within a previously set predetermined time period, a substantially uppermost position is obtained as the first corrected position. Therefore, the object position in the up-down direction can more accurately be detected.

That is, the position in the up-down direction is detected being lower than the actual position in the up-down direction due to the effect of the reflected wave in the road surface (see FIG. 4). Therefore, the substantially uppermost position, among the positions in the up-down direction within the previously set predetermined time period, is obtained as the first corrected position, allowing more accurate detection of the object position in the up-down direction by appropriately setting the predetermined time period.

According to the third aspect, the first average value, which is an average value of the positions in the up-down direction within the previously set predetermined time period, and the first distribution, which is distribution of the positions in the up-down direction within the previously set predetermined time period, are obtained. The first corrected position is then obtained based on the obtained first average value and the obtained first distribution. Therefore, the object position in the up-down direction can more accurately be detected.

That is, the position in the up-down direction is detected lower than the actual position in the up-down direction due to the effect of the reflected wave in the road surface (see FIG. 4). Also, the first average value and the first distribution show how the detected position in the up-down direction changes. Therefore, the first corrected position is obtained based on the first average value and the first distribution, allowing more accurate detection of the object position in the up-down direction by appropriately setting the predetermined time period.

According to the fourth aspect, the first corrected position is obtained by adding, to the first average value, a product which is obtained by multiplying the first distribution by the first predetermined number, which is previously set, that is equal to or greater than 1. Therefore, the object position in the up-down direction can more accurately be detected.

That is, for example, when the detected positions in the up-down direction have a normal distribution, the object position in the up-down direction can more accurately be detected by adding, to the first average value, a product which is obtained by multiplying the first distribution by "3" (i.e., setting "3" to the first predetermined number).

According to the fifth aspect, the first predetermined number is set to be equal to or greater than 2 and equal to or less than 4. Therefore, the object position in the up-down direction can more accurately be detected.

That is, for example, when the detected positions in the up-down direction have a normal distribution, the object position in the up-down direction can more accurately be detected by adding, to the first average value, a product which is obtained by multiplying the first distribution by "3" (i.e., setting "3" to the first predetermined number).

According to the sixth aspect, the first reflectance characteristic of the radio wave transmitted from the radar device is estimated. The first reflectance characteristic is the reflectance characteristic in the road surface on which the vehicle travels. The first corrected position is then obtained based on the estimated first reflectance characteristic. Therefore, the object position in the up-down direction can more accurately be detected.

That is, degree of the effect of the reflected wave in the road surface changes based on the reflectance characteristic of the road surface reflectance or the like. For example, if the road surface reflectance is close to 100% (see FIG. 4(*b*)), the road surface position is detected as the object position in the up-down direction. Also, for example, if the road surface reflectance is close to 0% (see FIG. 4(*c*)), the actual object position is detected as the object position in the up-down direction. Therefore, the first corrected position is obtained based on the estimated first reflectance characteristic, allowing more accurate detection of the object position in the up-down direction.

According to the seventh aspect, the image information on the road surface on which the vehicle travels is generated. The first reflectance characteristic is then estimated based on the generated image information on the road surface. Therefore, the first reflectance characteristic can accurately be estimated.

That is, the first reflectance characteristic, which is the reflectance characteristic in the road surface, can be estimated based on the type of the road surface. For example, if the road surface is asphalted, the reflectance is large while, if the road surface is gravel, the reflectance is small. Therefore, the type of the road surface is estimated based on the image information on the road surface to estimate the first reflectance characteristic, which is the reflectance characteristic in the road surface, allowing accurate estimation of the first reflectance characteristic.

According to the eighth aspect, the object position in the left-right direction is obtained based on the phase difference between the respective reception signals received by the plurality of element antennas. The obtained position in the left-right direction is then corrected based on the history of the obtained positions in the left-right direction, and the second corrected position, which is a position in the left-right direction after the correction, is obtained. Therefore, the object position in the left-right direction can accurately be detected.

That is, the position in the left-right direction is corrected based on the history of the obtained positions in the left-right direction, and the second corrected position, which is the position in the left-right direction after the correction, is obtained, allowing accurate detection of the object position in the left-right direction.

According to the ninth aspect, the receive antenna has the plurality of element antennas disposed in the left-right direction. The object position in the left-right direction is obtained based on the phase difference between the respective reception signals received by the plurality of element antennas. Furthermore, the obtained position in the left-right direction is corrected based on the history of the obtained positions in the left-right direction, and the second corrected position, which is the position in the left-right direction after the correction, is obtained. Therefore, the object position in the left-right direction can accurately be detected.

That is, the object position in the left-right direction can be obtained based on the phase difference between the respective reception signals received by the plurality of element antennas disposed in the left-right direction. Furthermore, the position in the left-right direction is corrected based on the history of the obtained positions in the left-right direction, and the second corrected position, which is the position in the left-right direction after the correction, is obtained, allowing accurate detection of the object position in the left-right direction.

According to the tenth aspect, among the positions in the left-right direction within the previously set predetermined time period, a substantially frontmost position is obtained as the second corrected position. Therefore, the object position in the left-right direction can more accurately be detected.

That is, the position in the left-right direction is detected to a side spaced from the actual position in the left-right direction relative to the front position of the vehicle due to the effect of the reflected wave in the side wall (see FIG. 5). Therefore, among the positions in the left-right direction within the previously set predetermined time period, the substantially frontmost position is obtained as the second corrected position, allowing more accurate detection of the object position in the left-right direction by appropriately setting the predetermined time period. In the present invention, the "substantially frontmost position" refers to a position substantially closest to the front of the vehicle.

According to the eleventh aspect, the second average value, which is an average value among the positions in the left-right direction within the previously set predetermined time period, and the second distribution, which is distribution of the positions in the left-right direction within the previously set predetermined time period, are obtained, and the second corrected position is obtained based on the obtained second average value and the obtained second distribution. Therefore, the object position in the left-right direction can more accurately be detected.

That is, the position in the left-right direction is detected to a side spaced from the actual position in the left-right direction relative to the front position of the vehicle due to the effect of the reflected wave in the side wall (see FIG. 5). The second average value and the second distribution indicate how the detected position in the left-right direction changes. Therefore, the second corrected position is obtained based on the second average value and the second distribution, allowing more accurate detection of the object position in the left-right direction by appropriately setting the predetermined time period.

According to the twelfth aspect, the second corrected position is obtained by subtracting, from the second average value, a product which is obtained by multiplying the second distribution by the second predetermined number, which is previously set, that is equal to or greater than 1. Therefore, the object position in the left-right direction can more accurately be detected.

That is, for example, when the detected positions in the left-right direction have a normal distribution, the object position in the left-right direction can more accurately be detected by subtracting, from the second average value, a product which is obtained by multiplying the second distribution by "3" (i.e., setting "3" to the second predetermined number).

According to the thirteenth aspect, the second predetermined number is set to be equal to or greater than 2 and equal to or less than 4. Therefore, the object position in the left-right direction can more accurately be detected.

That is, for example, when the detected positions in the left-right direction have a normal distribution, the object position in the left-right direction can more accurately be detected by adding, to the second average value, a product which is obtained by multiplying the second distribution by "3" (i.e., setting "3" to the second predetermined number).

According to the fourteenth aspect, the second reflectance characteristic of the radio wave transmitted from the radar device is estimated. The second reflectance characteristic is the reflectance characteristic in the side wall on the road on which the vehicle travels. The second corrected position is then obtained based on the estimated second reflectance characteristic. Therefore, the object position in the left-right direction can more accurately be detected.

That is, the degree of effect of the reflected wave in the side wall changes based on the reflectance characteristic of the side wall reflectance or the like. For example, if the side wall reflectance is close to 100% (see FIG. 5(b)), the surface position of the side wall is detected as the object position in the left-right direction. Also, for example, if the side wall reflectance is close to 0% (see FIG. 5(c)), the actual object position is detected as the object position in the left-right direction. Therefore, the second corrected position is obtained based on the estimated second reflectance characteristic, allowing more accurate detection of the position of the object in the left-right direction.

According to the fifteenth aspect, the image information on the side wall on the road on which the vehicle travels is generated. The second reflectance characteristic is then estimated based on the generated image information on the side wall. Therefore, the second reflectance characteristic can accurately be estimated.

That is, the second reflectance characteristic, which is the reflectance characteristic in the side wall, can be estimated based on the type of the side wall. For example, if the side wall is formed of concrete, a steel material, or the like, the reflectance is large, while, if the side wall is formed of glass, resin, or the like, the reflectance is small. Therefore, the type of the side wall is estimated based on the image information on the side wall to estimate the second reflectance characteristic, which is the reflectance characteristic in the side wall, allowing accurate estimation of the second reflectance characteristic.

According to the sixteenth aspect, the plurality of element antennas are disposed such that at least some of the plurality of element antennas is shifted in the up-down direction from the others. The object position in the up-down direction is then obtained based on the phase difference between the respective reception signals received by the plurality of element antennas. Also, the position in the up-down direction is corrected based on the history of the positions in the up-down direction, and the first corrected position, which is the position in the up-down direction after the correction, is obtained. Therefore, the object position in the up-down direction can accurately be detected.

That is, by shifting in the up-down direction some of the plurality of element antennas, which are included in the receive antenna and disposed in the left-right direction, from the others, the azimuth of the object in the up-down direction can be detected based on the phase difference between the respective reception signals received by the plurality of element antennas. Also, the position in the up-down direction is corrected based on the history of the obtained positions in the up-down direction, and thereby the first corrected position which is a position in the up-down direction after the correction is obtained. Therefore, the object position in the up-down direction can be accurately detected.

DESCRIPTION OF EMBODIMENTS

Hereinafter, an embodiment of a radar device according to the present invention is described with reference to the accompanying drawings. A radar device 100 according to the present invention is a radar device which is mounted in a vehicle VR and detects respective positions of an object TG present around the vehicle VR in the up-down and left-right directions (see FIG. 4 and FIG. 5). First, an example configuration of the radar device 100 mounted in the vehicle VR is described with reference to FIG. 1.

Figure 1:
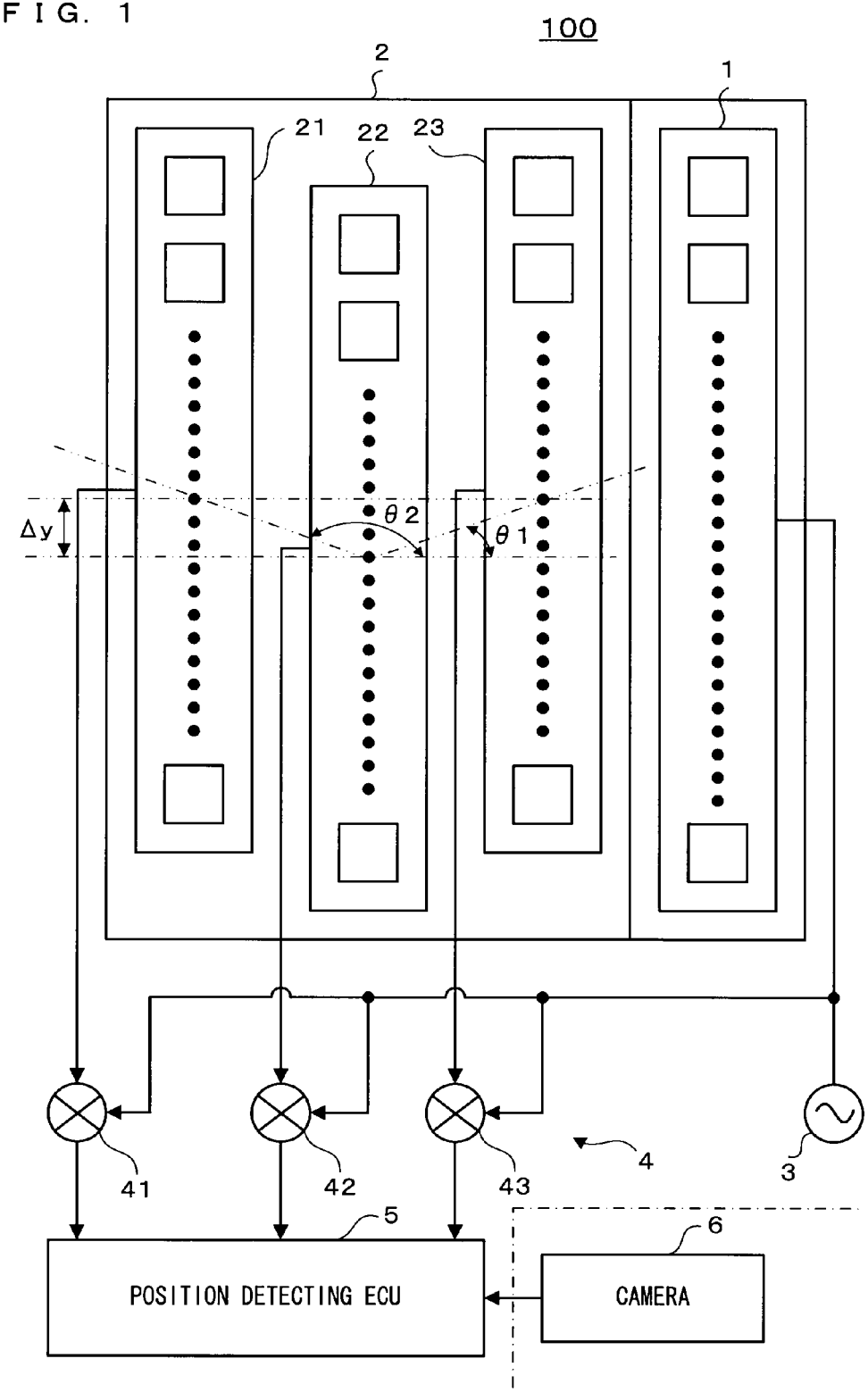
FIG. 1 is a block diagram showing an example configuration of a radar device according to the present invention.

FIG. 1 is a block diagram showing the example configuration of the radar device 100 according to the present invention. Here, the radar device 100 is, for example, a radar device having the FM-CW system and also a DBF radar device which performs DBF (Digital Beam Forming) processing on a reception signal. The radar device 100 detects a distance to the object TG and the relative speed by the DBF processing, and obtains by the phase monopulse method the respective positions of the object TG in the up-down and left-right directions. The description below is given mainly in terms of obtainment of the respective positions of the object TG in the up-down and left-right directions by the phase monopulse method in the radar device 100. Most of description in terms of the detection of the distance to the object TG and the relative speed by the FM-CW system and the DBF processing is omitted.

As shown in FIG. 1, the radar device 100 according to the present invention includes a transmit antenna 1, a receive antenna 2, an oscillator 3, a mixing section 4, and a position detecting ECU 5. The position detecting ECU 5 is communicatively connected to a camera 6.

The transmit antenna 1 is an antenna which is driven by the oscillator 3 and transmits a transmission wave (electromagnetic wave). The transmit antenna 1 is disposed on the same plane on which the receive antenna 2 is disposed, connected to one feed point, and includes a plurality of patch antennas (indicated by open squares in FIG. 1) which are disposed in the up-down direction. Furthermore, an output terminal of the oscillator 3, which has the center frequency of f0 (for example, 76 GHz), is connected to the feed point of the transmit antenna 1.

The receive antenna 2 is an antenna which receives the reflected wave transmitted from the transmit antenna 1 and reflected from the object TG, and the like. The receive antenna 2 includes three element antennas 21, 22, and 23 which are disposed in the left-right direction (horizontal direction). The element antennas 21, 22, and 23 each have a plurality of patch antennas (indicated by open squares in FIG. 1), and each patch antenna is connected to a feed point provided for each of the element antennas 21, 22, and 23 so that respective patch antennas have substantially the same line length to the corresponding feed point. Here, the element antennas 21, 22, and 23 correspond to a plurality of (here, three) element antennas.

In the present embodiment, the patch antennas are disposed in a line in the up-down direction (vertical direction) in each of the element antennas 21, 22, and 23. The patch antennas, however, may be disposed in two or more lines, or disposed in another manner. The element antennas 21, 22, and 23 are disposed such that the respective center points of the element antennas are alternately shifted in the up-down direction. That is, an upper element antenna group includes the element antennas 21 and 23, and a lower element antenna group includes the element antenna 22, and the upper element antenna group and the lower element antenna group are disposed so as to be shifted in the up-down direction from each other by a distance $\Delta y$.

The oscillator 3 generates a signal, in which the triangular wave modulation having a frequency modulation width $\Delta F$ is applied to a carrier wave having a frequency f0, by using a control voltage output from a DC power supply (not shown) for modulation. That is, the oscillator 3 generates a modulated wave (i.e., a transmission signal) having the frequency $f0 \pm \Delta F/2$. The generated modulated wave is emitted from the transmit antenna 1 as the electromagnetic wave.

The mixing section 4 includes three mixers 41, 42, and 43 which are connected to the element antennas 21, 22, and 23, respectively, of the receive antenna 2. A local signal, which is part of the transmission signal from the oscillator 3, is input to each of the mixers 41, 42, and 43, and the reception signal from each of the element antennas 21, 22, and 23 is mixed with the local signal and down converted so as to have an intermediate frequency. A beat signal (a difference signal between the transmission signal and the reception signal), which is used for detecting the distance and the relative speed by the FM-CW system in the radar device 100, is obtained by the down conversion.

The position detecting ECU (Electronic Control Unit) 5 is an ECU which obtains the respective positions of the object TG in the up-down and left-right directions, based on a beat signal generated by the mixing section 4 and image information from the camera 6. Specific configuration and operation of the position detecting ECU 5 will be described below with reference to FIG. 2, and the like.

The camera 6 includes a CCD (Charge Coupled Device) and the like, and generates image information on a road surface on which the vehicle VR travels and image information on a side wall on the road on which the vehicle VR travels. Here, the camera 6 corresponds to part of a first image generator and part of a second image generator.

Figure 2:
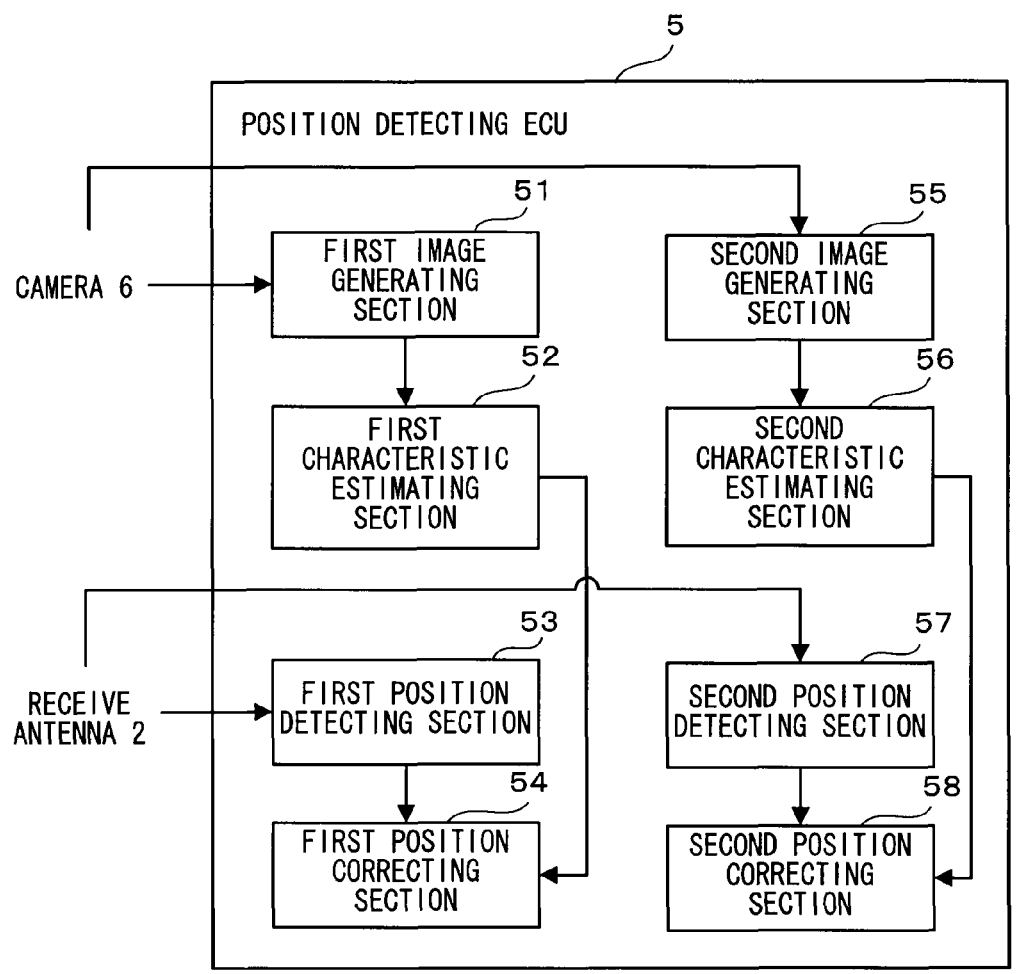
FIG. 2 is a block diagram showing an example of a functional configuration of a position detecting ECU.

FIG. 2 is a block diagram showing an example of a functional configuration of the position detecting ECU 5. As shown in FIG. 2, the position detecting ECU 5 functionally includes a first image generating section 51, a first characteristic estimating section 52, a first position detecting section 53, a first position correcting section 54, a second image generating section 55, a second characteristic estimating section 56, a second position detecting section 57, and a second position correcting section 58.

The position detecting ECU 5 causes a microcomputer, which is disposed at an appropriate position in the position detecting ECU 5, to execute a control program previously stored in a ROM (Read Only Memory) or the like, which is disposed at an appropriate position in the position detecting ECU 5, thereby causing the microcomputer to functionally act as a function parts of the first image generating section 51, the first characteristic estimating section 52, the first position detecting section 53, the first position correcting section 54, the second image generating section 55, the second characteristic estimating section 56, the second position detecting section 57, the second position correcting section 58, and the like.

The first image generating section 51 is a function part which generates, via the camera 6, the image information on the road surface on which the vehicle VR travels. Here, the first image generating section 51 corresponds to part of the first image generator. Specifically, the first image generating section 51 generates the image information on the road surface RS via the camera 6 at a previously set predetermined time interval (for example, 0.2 msec) (see FIG. 4).

The first characteristic estimating section 52 is a function part which estimates a first reflectance characteristic of a radio wave transmitted from the radar device 100 (here, the transmit antenna 1), based on the image information on the road surface RS generated by the first image generating section 51. The first reflectance characteristic is a reflectance characteristic in the road surface RS on which the vehicle VR travels. Here, the first characteristic estimating section 52 corresponds to the first characteristic estimator. Specifically, the first characteristic estimating section 52 estimates a type of the road surface RS, based on the image information on the road surface RS to estimate a reflectance R1 in the road surface RS. For example, if the road surface RS is asphalted, the first characteristic estimating section 52 estimates that the reflectance R1 is large while, if the road surface RS is gravel, the first characteristic estimating section 52 estimates that the reflectance R1 is small.

Since the type of the road surface RS is estimated based on the image information on the road surface RS and the first reflectance characteristic (here, the reflectance R1), which is the reflectance characteristic in the road surface RS, is estimated as described above, the first reflectance characteristic (here, the reflectance R1) is accurately estimated.

While, in the present embodiment, the case is described where the first characteristic estimating section 52 estimates the reflectance R1, based on the image information on the road surface RS, it is possible to adopt an embodiment in which the first characteristic estimating section 52 estimates the reflectance R1 based on other information. For example, it is possible to adopt an embodiment in which the first characteristic estimating section 52 estimates the reflectance R1, based on map information (road surface information: information such as whether the road is a paved road) from a navigation system, road surface information from VICS (Vehicle Information and Communication System), rainfall and snow information, and the like. In this case, the estimation process is simplified.

Furthermore, while, in the present embodiment, the case is described where the first characteristic estimating section 52 estimates the reflectance R1 as the first reflectance characteristic, it is possible to adopt an embodiment in which the first characteristic estimating section 52 estimates a first reflectance characteristic of another kind. For example, it is possible to adopt an embodiment in which the first characteristic estimating section 52 estimates an average value and distribution of the reflectance R1. In this case, the first position correcting section 54 can more accurately obtain the first corrected position, which is a position in the up-down direction after the correction, based on the average value and distribution of the reflectance R1.

The second image generating section 55 is a function part which generates, via the camera 6, the image information on the side wall SW on the road on which the vehicle VR travels. Here, the second image generating section 55 corresponds to part of the second image generator. Specifically, the second image generating section 55 generates the image information on the side wall SW via the camera 6 at a previously set predetermined time interval (for example, 0.2 msec) (see FIG. 5).

The second characteristic estimating section 56 is a function part which estimates a second reflectance characteristic of a radio wave transmitted from the radar device 100 (here, the transmit antenna 1), based on the image information on the side wall SW generated by the second image generating section 55. The second reflectance characteristic is a reflectance characteristic in the side wall SW on the road on which the vehicle VR travels. Here, the second characteristic estimating section 56 corresponds to the second characteristic estimator. Specifically, the second characteristic estimating section 56 estimates a type of the side wall SW, based on the image information on the side wall SW to estimate a reflectance R2 in the side wall SW. For example, if the side wall SW is formed of concrete, a steel material, or the like, the second characteristic estimating section 56 estimates that the reflectance R2 is large while, if the side wall SW is formed of glass, resin, or the like, the second characteristic estimating section 56 estimates that the reflectance R2 is small.

Since the type of the side wall SW is estimated based on the image information on the side wall SW and the second reflectance characteristic (here, the reflectance R2), which is the reflectance characteristic in the side wall SW, is estimated as described above, the second reflectance characteristic (here, the reflectance R2) can accurately be estimated.

While, in the present embodiment, the case is described where the second characteristic estimating section 56 estimates the reflectance R2, based on the image information on the side wall SW, it is possible to adopt an embodiment in which the second characteristic estimating section 56 estimates the reflectance R2 based on other information. For example, it is possible to adopt an embodiment in which the second characteristic estimating section 56 estimates the reflectance R2, based on the map information (side wall information: information such as the side wall material) and the like from the navigation system. In this case, the estimation process is simplified.

Furthermore, while, in the present embodiment, the case is described where the second characteristic estimating section 56 estimates the reflectance R2 as the second reflectance characteristic, it is possible to adopt an embodiment in which the second characteristic estimating section 56 estimates second reflectance characteristic of another kind. For example, it is possible to adopt an embodiment in which the second characteristic estimating section 56 estimates an average value and distribution of the reflectance R2. In this case, the second position correcting section 58 can more accurately obtain the second corrected position, which is a position in the left-right direction after the correction, based on the average value and distribution of the reflectance R2.

The first position detecting section 53 is a function part which detects a position H of the object TG in the up-down direction, based on a phase difference between the respective reception signals received by the receive antenna 2 (the element antennas 21, 22, and 23). The first position detecting section 53 corresponds to the first position detector.

The second position detecting section 57 is a function part which detects a position W of the object TG in the left-right direction, based on the phase difference between the respective reception signals received by the receive antenna 2 (the element antennas 21, 22, and 23). The second position detecting section 57 corresponds to the second position detector.

Figure 3:
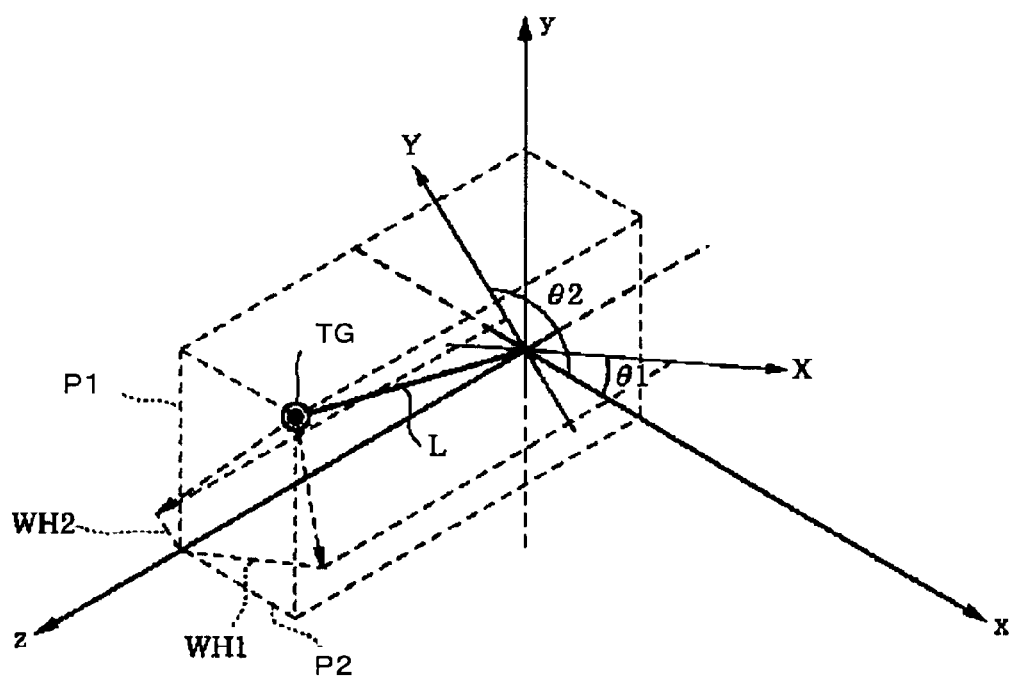
FIG. 3 is an explanatory drawing showing an example method of detecting an object position in the up-down direction.

Here, methods of detecting the position H of the object TG in the up-down direction and the position W of the object TG in the left-right direction, which are conducted by the first position detecting section 53 and the second position detecting section 57, are described with reference to FIG. 3. FIG. 3 is an explanatory drawing showing an example method of detecting the position of the object TG in the up-down direction.

Specifically, the first position detecting section 53 and the second position detecting section 57 detect, by the phase monopulse method, an angle of the object TG in a first oblique direction (angle $\theta 1$: see FIG. 1), which is caused by the element antenna 22 and the element antenna 23, and an angle of the object TG in a second oblique direction (angle $\theta 2$: see FIG. 1), which is caused by the element antenna 21 and the element antenna 22, respectively. The first position detecting section 53 then obtains the position P1 of the object TG in the up-down direction, based on the detected two angles ($\theta$ (X) and $\theta$ (Y) described below with reference to FIG. 3). Furthermore, the second position detecting section 57 obtains the position P2 of the object TG in the left-right direction, based on the detected two angles (θ (X) and θ (Y) described below).

In FIG. 3, an x-axis direction corresponds to the left-right direction of the radar device 100, a y-axis direction corresponds to the up-down direction of the radar device 100, and the positive direction of a z axis corresponds to the frontward of the radar device 100. Also, the first oblique direction and the second oblique direction in FIG. 1 correspond to an X axis on an xy plane and a Y axis on the xy plane, respectively. Given that a distance to the object TG is L, an angle with respect to the z axis of the object TG in the first oblique direction, i.e. the X direction is θ (X), and an angle with respect to the z axis of the object TG in the second oblique direction i.e. the Y direction is θ (Y), a displacement WH1 and a displacement WH2 of the target object T in the first oblique direction and the second oblique direction, respectively, are represented by the following equations (1) and (2), respectively.

$$WH1 = L \times \sin(\theta(X)) \quad (1)$$

$$WH2 = L \times \sin(\theta(Y)) \quad (2)$$

The respective angles θ (X) and θ (Y) with respect to the first oblique direction and the second oblique direction, respectively, can be detected by the phase monopulse method, based on the phase difference between the respective reception signals received by the element antennas 21, 22, and 23. Since the distance L can be detected by the DBF combining technique with respect to the left-right direction, the displacement WH1 and the displacement WH2 of the target object T can be obtained from the above equations (1) and (2), respectively.

Next, an angle in the y-axis direction, i.e., the up-down direction, is obtained by using the displacement WH1 and the displacement WH2. Given that an angle with respect to the x axis in the first oblique direction is θ1 and an angle with respect to the y axis in the second oblique direction is θ2 (see FIG. 1), the position P1 of the object TG in the up-down direction (height) and the position P2 of the object TG in the left-right direction can be represented by the following equations (3) and (4), respectively.

$$P1 = (WH1/\cos(\theta1) - WH2/\cos\theta2)) / (1/\tan(\theta1) - 1/\tan(\theta2)) \quad (3)$$

$$P2 = (WH1/\sin(\theta1) - WH2/\sin(\theta2)) / (1/\tan(\theta1) - 1/\tan(\theta2)) \quad (4)$$

By substituting respective values obtained by using the equations (1) and (2) for the displacements WH1 and WH2 in the above equations (3) and (4), the position P1 of the object TG in the up-down direction and the position P2 of the object TG in the left-right direction can be obtained, respectively.

Figure 4:
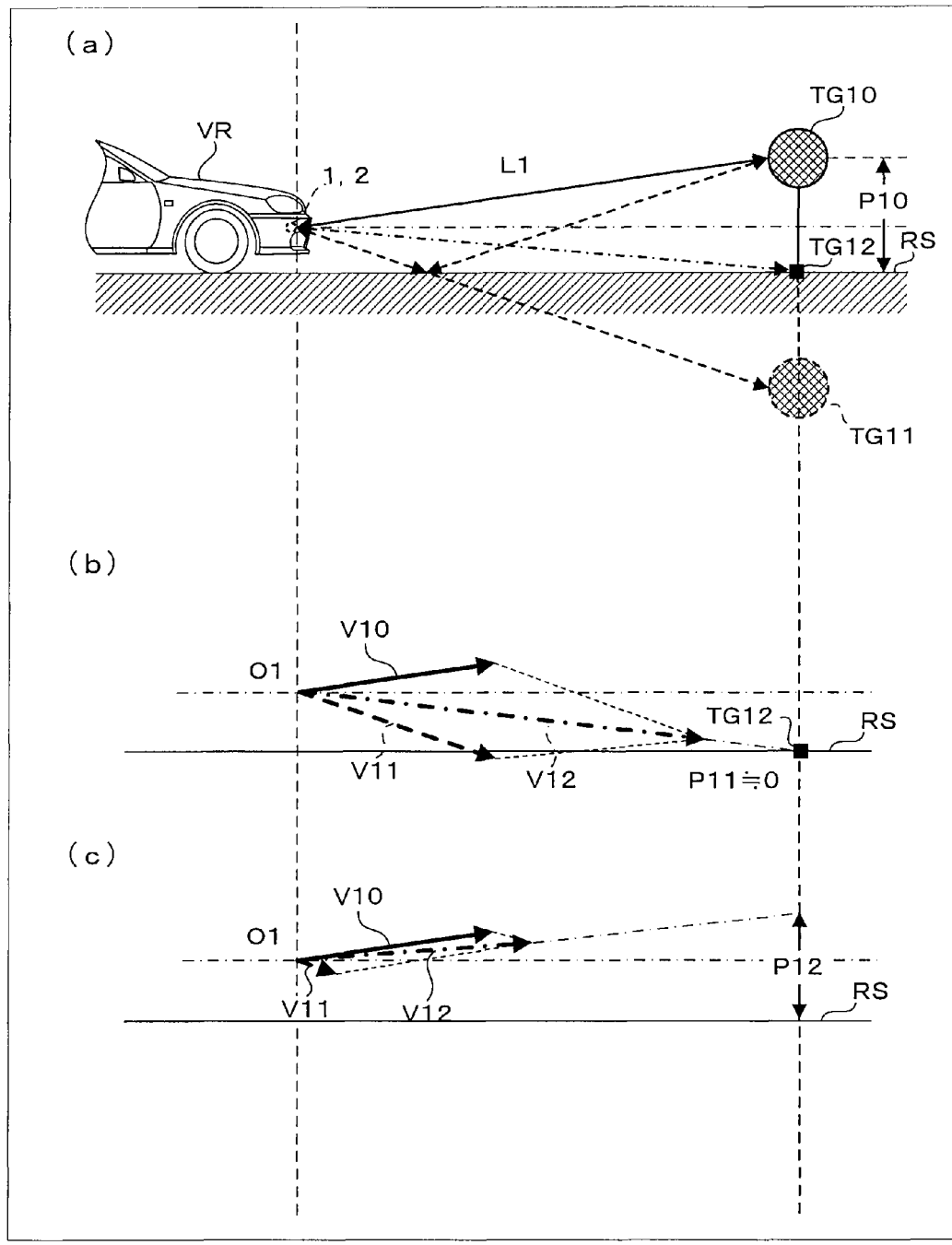
FIG. 4 shows explanatory drawings of example effects of a reflected wave in a road surface on the detection of the object position in the up-down direction.

Here, how the position P1 of the object TG in the up-down direction, which is detected by the first position detecting section 53, changes is described with reference to FIG. 4. FIG. 4 shows explanatory drawings of example effects of the reflected wave in the road surface RS on the detection of the position P1 of the object TG10 in the up-down direction. FIG. 4(a) is a side conceptual diagram. As shown in FIG. 4(a), the transmit antenna 1 and the receive antenna 2, which detect the object TG10 in front of the vehicle VR, are disposed on the front part of the vehicle VR. Here, it is assumed that a distance L1 from the transmit antenna 1 and the receive antenna 2 to the object TG10 is obtained by the FM-CW system and the DBF processing.

The transmission wave transmitted from the transmit antenna 1 is reflected from the object TG10, and the reflected wave, which is generated by the reflection, is incident on the receive antenna 2 by a shortest route indicated by a solid line and a route via the reflection in the road surface RS which is indicated by a dotted line. In the description given below, for reasons of convenience, the reflected wave incident on the receive antenna 2 by the shortest route indicated by the solid line is referred to as a "direct wave" and the reflected wave incident on the receive antenna 2 by the route via the reflection in the road surface RS indicated by the dotted line is referred to as a "road surface reflection wave". The road surface reflection wave is received by the receive antenna 2 as a reflected wave which causes the same phase difference as that caused by the reflected wave from a virtual object TG11 in the case where there is virtually the virtual object TG11 at a position symmetrical to the object TG10 about the plane of the road surface RS (here, it is assumed that the road surface RS is a flat surface).

FIG. 4(b) and FIG. 4(c) are vector diagrams each showing an example of a signal vector defining the position P1, in the up-down direction, detected by the first position detecting section 53 in a situation indicated in FIG. 4(a). A vector V10 is a signal vector corresponding to the direct wave. A vector V11 is a signal vector corresponding to the road surface reflection wave. A vector V12 is a synthesized vector of the vector V10 and the vector V11. FIG. 4(b) shows the case where the reflectance R1 of the road surface RS is 100%, and FIG. 4(c) shows the case where the reflectance R1 of the road surface RS is close to 0% (here, about 10%).

As shown in FIG. 4(b), when the reflectance R1 of the road surface RS is 100%, the intensity of the road surface reflection wave becomes substantially the same as the intensity of the direct wave and therefore, the length of the vector V11 indicative of the signal intensity becomes substantially the same as the length of the vector V10. Therefore, a direction of the synthesized vector V12 is directed to a middle point TG12 (i.e., positioned on the road surface RS) between the object TG10 and the virtual object TG11, and the position P1 (height) of the object TG in the up-down direction, which is detected by the first position detecting section 53, becomes approximately "0". Therefore, the height is not illustrated in FIG. 4(b).

As shown in FIG. 4(c), when the reflectance R1 of the road surface RS is 10%, the intensity of the road surface reflection wave becomes substantially (1/10) as compared to the intensity of the direct wave and therefore, the length of the vector V11 indicative of the signal intensity becomes substantially (1/10) of the length of the vector V10. Therefore, the direction of the synthesized vector V12 becomes close to a direction toward the object TG10, and the position P11 (height) of the object TG10 in the up-down direction, which is detected by the first position detecting section 53, becomes a value that is approximate to a height P10 of the object TG10.

Figure 6:
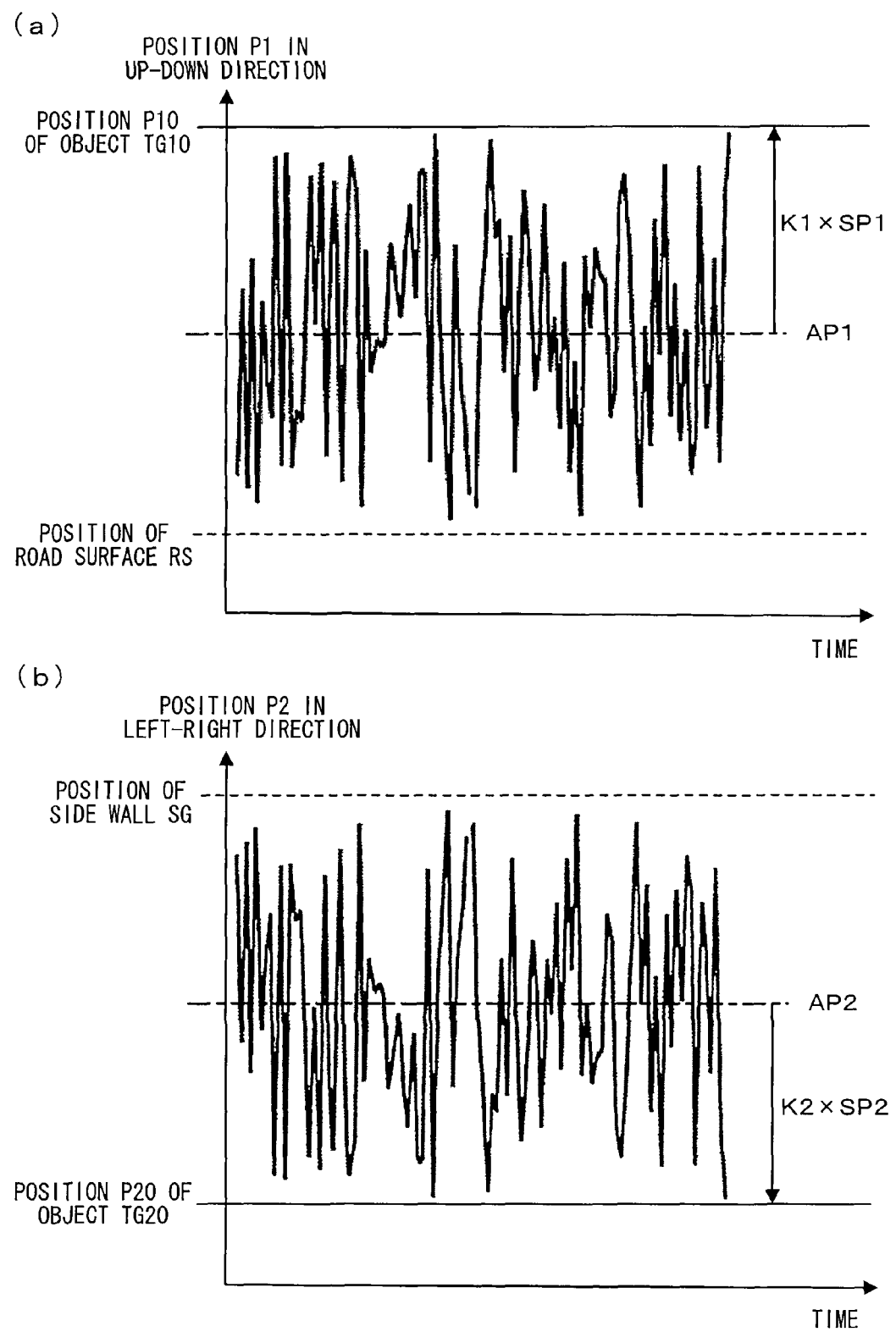
FIG. 6 shows graphs showing examples of respective results of detection of the object position in the up-down direction and detection of the object position in the left-right direction.

FIG. 6 shows graphs showing examples of respective results of detection of the object position in the up-down direction and detection of the object position in the left-right direction. FIG. 6(a) is a graph showing an example of a result of detection of the position P1 in the up-down direction which is detected by the first position detecting section 53. FIG. 6(b) is a graph showing an example of a result of detection of the position P2 in the left-right direction which is detected by the second position detecting section 57. As shown in FIG. 6(a), the position P1 in the up-down direction, which is detected by the first position detecting section 53, changes between the road surface position (i.e., height "0") and the height P10 of the object TG10, according to change of the reflectance R1 of the road surface RS, as described with reference to FIG. 4.

Returning again to FIG. 2, the functional configuration of the position detecting ECU 5 is described. The first position correcting section 54 is a function part which corrects the position P1 in the up-down direction, based on the history of the position P1 in the up-down direction, which are detected by the first position detecting section 53 to obtain a first corrected position P1A which is the position in the up-down direction after the correction. Here, the first position correcting section 54 corresponds to the first position corrector. Also, specifically, the first position correcting section 54 obtains a first average value AP1, which is an average value of the position P1 in the up-down direction within the previously set predetermined time period (for example, 0.2 sec) and a first distribution SP1, which is distribution of the position P1 in the up-down direction within the previously set predetermined time period to obtain the first corrected position P1A, based on the obtained first average value AP1 and the obtained first distribution SP1.

For example, the first position correcting section 54 obtains the first corrected position P1A using the following equation (5) by adding, to the first average value AP1, a product which is obtained by multiplying the first distribution SP1 by a first predetermined number K1 which is previously set and that is equal to or greater than 1.

$$P1A = AP1 + K1 \times SP1 \quad (5)$$

where the first predetermined number K1 is set to, for example, "3".

As described above, the first average value AP1 and the first distribution SP1 indicate how the detected position P1 in the up-down direction changes. Therefore, the first corrected position P1A is obtained based on the first average value AP1 and the first distribution SP1, and, as a result, the position of the object TG10 in the up-down direction can more accurately be detected by appropriately setting the predetermined time period.

Also, for example, when the detected position P1 in the up-down direction has a normal distribution, the object position in the up-down direction can more accurately be detected by adding, to the first average value AP1, a product which is obtained by multiplying the first distribution SP1 by "3" (i.e., by setting "3" to the first predetermined number K1) (see FIG. 6(a)).

While, in the present embodiment, the case is described where the first position correcting section 54 obtains the first corrected position P1A, based on the first average value AP1 and the first distribution SP1, the first position correcting section 54 may correct the position P1 in the up-down direction, based on the history of the position P1 in the up-down direction to obtain the first corrected position P1A. For example, the first position correcting section 54 may obtain the substantially uppermost position as the first corrected position P1A, among the position P1 in the up-down direction within the previously set predetermined time period (for example, 0.2 sec).

Figure 5:
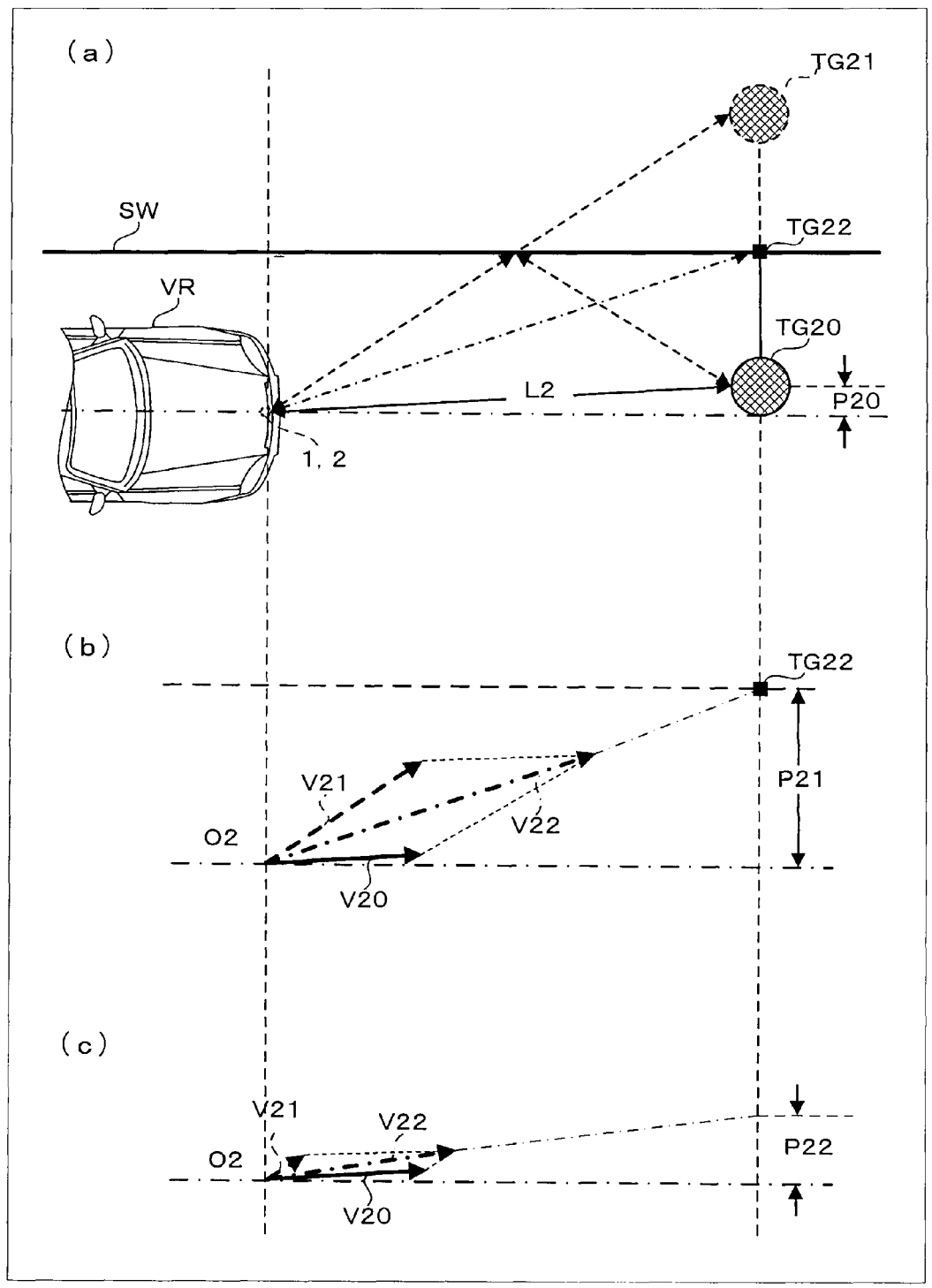
FIG. 5 shows explanatory drawings of example effects of the reflected wave in the side wall on the detection of an object position in the left-right direction.

Next, how the position P2 of the object TG in the left-right direction, which is detected by the second position detecting section 57, changes is described with reference to FIG. 5. FIG. 5 shows explanatory drawings of example effects of the reflected wave in the side wall SW on the detection of the position P2 of the object TG20 in the left-right direction. FIG. 5(a) is a plan view schematic diagram. As shown in FIG. 5(a), the transmit antenna 1 and the receive antenna 2, which detect the object TG20 in front of the vehicle VR, are disposed on the front part of the vehicle VR. Here, it is assumed that a distance L2 from the transmit antenna 1 and the receive antenna 2 to the object TG20 is obtained by the FM-CW system and the DBF processing. It is also assumed that a reference position of the position P2 in the left-right direction is a position in a front forward direction (here, vehicle's mid-axis direction indicated by a chain line) of the disposition positions of the transmit antenna 1 and the receive antenna 2 in the vehicle VR, and the position P2 in the left-right direction is defined based on a distance from the vehicle's mid-axis thereto.

The transmission wave transmitted from the transmit antenna 1 is reflected from the object TG20, and the reflected wave, which is generated by the reflection, is incident on the receive antenna 2 by a shortest route indicated by a solid line and a route via the reflection in the side wall SW which is indicated by a dotted line. In the description given below, for reasons of convenience, the reflected wave incident on the receive antenna 2 by the shortest route indicated by the solid line is referred to as a "direct wave" and the reflected wave incident on the receive antenna 2 by the route via the reflection in the side wall SW indicated by the dotted line is referred to as a "side wall reflection wave". The side wall reflection wave is received by the receive antenna 2 as a reflected wave which causes the same phase difference as that caused by the reflected wave from a virtual object TG21 in the case where there is virtually the virtual object TG21 at a position symmetrical to the object TG20 about the plane of the side wall SW (here, it is assumed that the side wall SW has a flat surface).

FIG. 5(b) and FIG. 5(c) are vector diagrams each showing an example of a signal vector defining the position P2, in the left-right direction, detected by the second position detecting section 57 in the situation indicated in FIG. 5(a). A vector V20 is a signal vector corresponding to the direct wave. A vector V21 is a signal vector corresponding to the side wall reflection wave. A vector V22 is a synthesized vector of the vector V20 and the vector V21. FIG. 5(b) shows the case where the reflectance R2 of the side wall SW is 100%, and FIG. 5(c) shows the case where the reflectance R2 of the side wall SW is close to 0% (here, about 10%).

As shown in FIG. 5(b), when the reflectance R2 of the side wall SW is 100%, the intensity of the side wall reflection wave becomes substantially the same as the intensity of the direct wave and therefore, the length of the vector V21 indicative of the signal intensity becomes substantially the same as the length of the vector V20. Therefore, a direction of the synthesized vector V22 is directed to a middle point TG22 (i.e., positioned on the side wall SW) between the object TG20 and the virtual object TG21, and the position P2 of the object TG20 in the left-right direction, which is detected by the second position detecting section 57, becomes the position P21 in the left-right direction.

As shown in FIG. 5(c), when a reflectance R2 of the side wall SW is 10%, the intensity of the side wall reflection wave becomes substantially (1/10) as compared to the intensity of the direct wave and therefore, the length of the vector V21 indicative of the signal intensity becomes substantially (1/10) of the length of the vector V20. Therefore, the direction of the synthesized vector V22 becomes close to the direction toward the object TG20, and the position P22 of the object TG20 in the up-down direction, which is detected by the second position detecting section 57, becomes a value that is approximate to the position P20 of the object TG20 in the left-right direction.

As described above, FIG. 6(b) is a graph showing an example of the result of the detection of the position P2 in the left-right direction which is detected by the second position detecting section 57. As shown in FIG. 6(b), the position P2 in the left-right direction, which is detected by the second position detecting section 57, changes between the side wall position P21 and the position P20 of the object TG20 in the left-right direction, according to change of the reflectance R2 of the side wall SW as described with reference to FIG. 5.

Returning again to FIG. 2, the functional configuration of the position detecting ECU 5 is described. The second position correcting section 58 is a function part which corrects the position P2 in the left-right direction, based on the history of the position P2 in the left-right direction, which are detected by the second position detecting section 57 to obtain the second corrected position P2A which is the position in the left-right direction after the correction. Here, the second position correcting section 58 corresponds to the second position corrector. Also, specifically, the second position correcting section 58 obtains the second average value AP2, which is an average value of the position P2 in the left-right direction within the previously set predetermined time period (for example, 0.2 sec) and the second distribution SP2, which is distribution of the position P2 in the left-right direction within the previously set predetermined time period to obtain the second corrected position P2A, based on the obtained second average value AP2 and the obtained second distribution SP2.

For example, the second position correcting section 58 obtains the second corrected position P2A with the following equation (6) by adding, to the second average value AP2, a product which is obtained by multiplying the second distribution SP2 by the second predetermined number K2 which is previously set and that is equal to or greater than 1.

$$P2A = AP2 - K2 \times SP2 \quad (6)$$

where the second predetermined number K2 is set to be, for example, "3".

As described above, the second average value AP2 and the second distribution SP2 indicate how the detected position P2 in the left-right direction changes. Therefore, the second corrected position P2A is obtained based on the second average value AP2 and the second distribution SP2, and, as a result, the position of the object TG20 in the left-right direction can more accurately be detected by appropriately setting the predetermined time period.

Also, for example, when the detected position P2 in the left-right direction has a normal distribution, the object position in the left-right direction can more accurately be detected by subtracting, from the second average value AP2, a product which is obtained by multiplying the second distribution SP2 by "3" (i.e., by setting "3" to the second predetermined number K2) (see FIG. 6(b)).

While, in the present embodiment, the case is described where the second position correcting section 58 obtains the second corrected position P2A, based on the second average value AP2 and the second distribution SP2, the second position correcting section 58 may correct the position P2 in the left-right direction, based on the history of the position P2 in the left-right direction, and obtain the second corrected position P2A. For example, the second position correcting section 58 may obtain the substantially frontmost position (the position having the shortest distance from the vehicle's mid-axis direction indicated by a chain line in FIG. 5(a)) as the second corrected position P2A, among the position P2 in the left-right direction within the previously set predetermined time period (for example, 0.2 sec).

Figure 7:
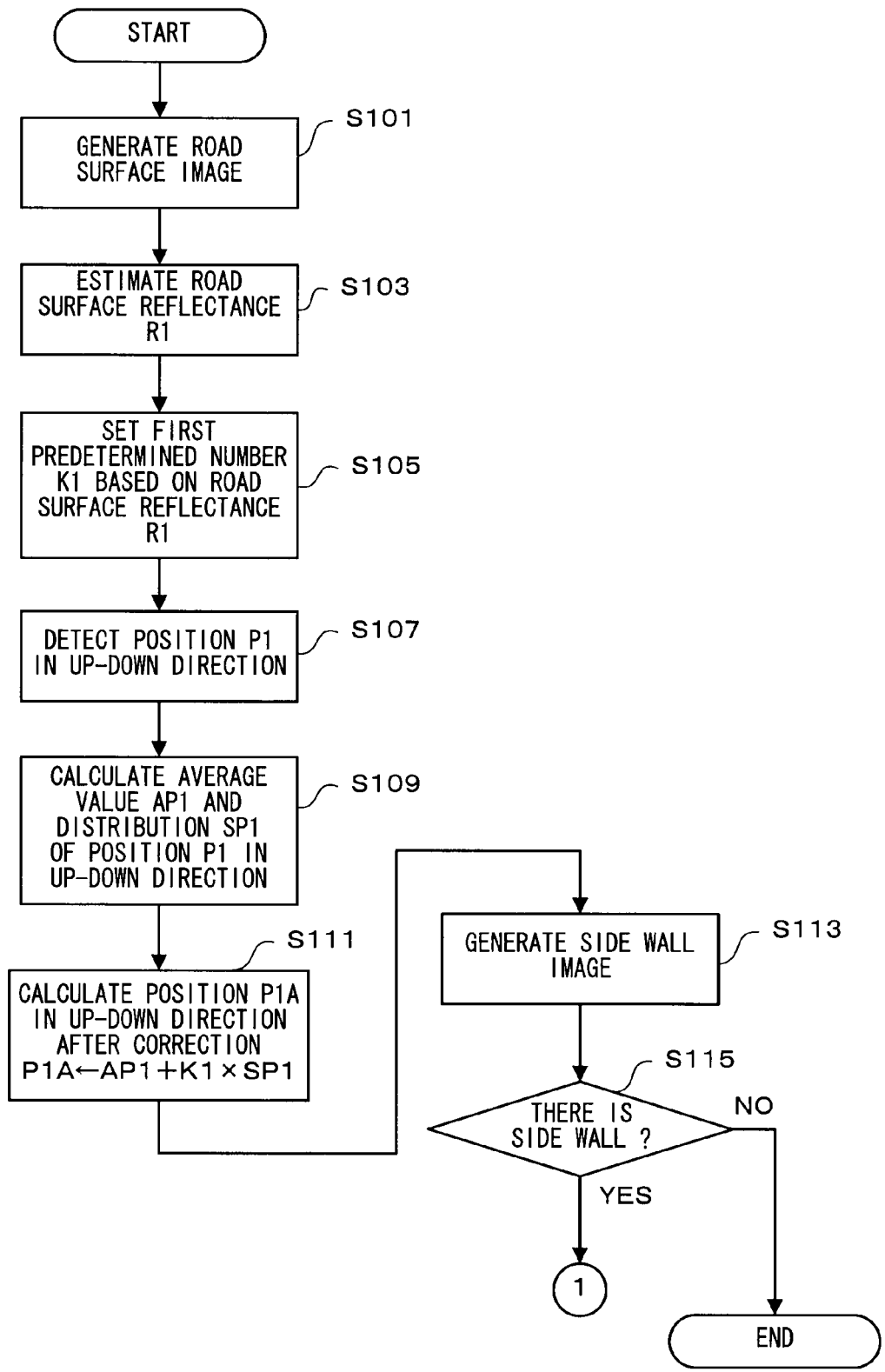
FIG. 7 is a flowchart (first half thereof) showing an example operation of the position detecting ECU.
Figure 8:
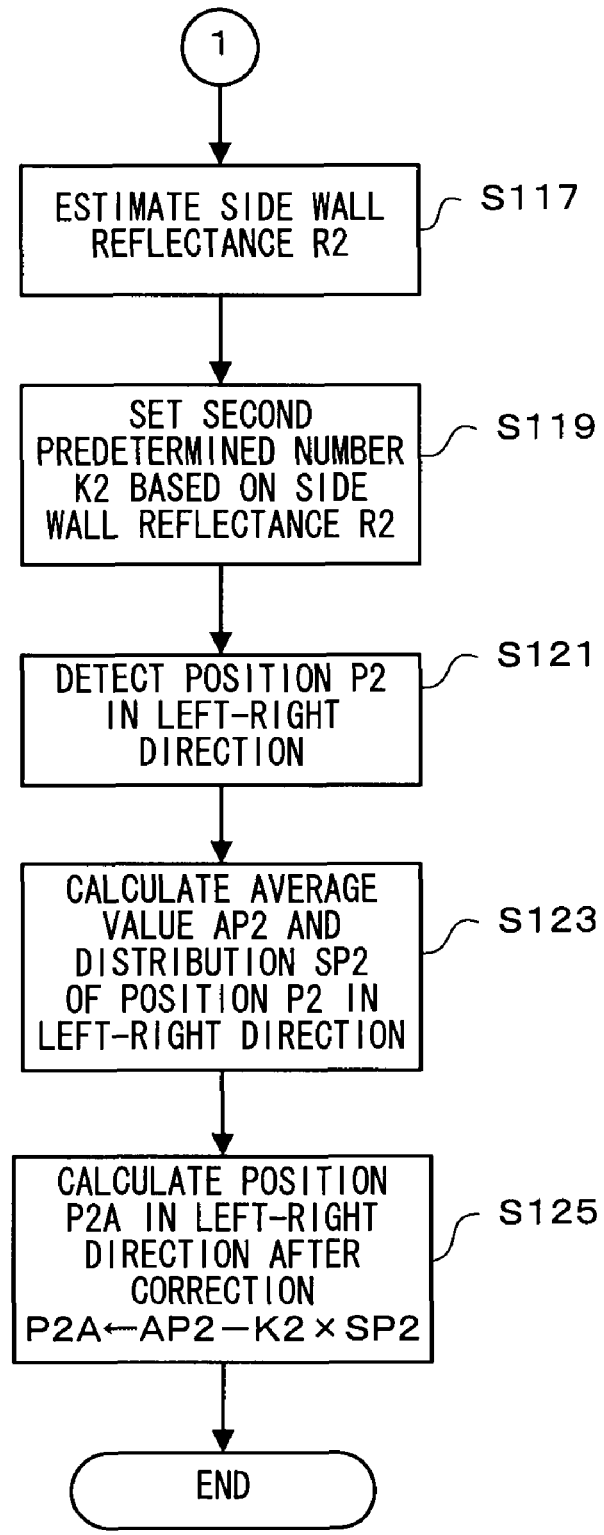
FIG. 8 is a flowchart (last half thereof) showing the example operation of the position detecting ECU.

FIG. 7 and FIG. 8 are flowcharts each showing an example operation of the position detecting ECU 5. First, as shown in FIG. 7, a road surface image is generated by the first image generating section 51 (S101). The reflectance R1 of the road surface RS is then estimated by the first characteristic estimating section 52 (S103). Next, the first predetermined number K1 is set by the first position correcting section 54, based on the reflectance R1 estimated in step S103 (S105).

Next, the position P1 of the object TG in the up-down direction is detected by the first position detecting section 53 (S107). Then, the first average value AP1 which is an average value, within the predetermined time period (for example, 0.2 sec), of the position P1 in the up-down direction detected in step S107 and the first distribution SP1 which is distribution of the position P1 in the up-down direction within the predetermined time period (for example, 0.2 sec) are calculated by the first position correcting section 54 (S109). Then, the first corrected position P1A is obtained by the first position correcting section 54 by adding, to the first average value AP1 calculated in step S109, a product which is obtained by multiplying the first distribution SP1 calculated in step S109 by the first predetermined number K1 set in step S105 (S111).

Next, a side wall image is generated by the second image generating section 55 (S113). Determination whether or not the side wall SW is present then made by the second characteristic estimating section 56, based on the side wall image generated in step S113 (S115). If it is determined that the side wall SW is not present (NO in S115), the process is ended. If it is determined that the side wall SW is present (YES in S115), the reflectance R2 of the side wall SW is estimated by the second characteristic estimating section 56 as shown in FIG. 8 (S117). Next, the second predetermined number K2 is set by the second position correcting section 58, based on the reflectance R2 estimated in step S117 (S119).

Next, the position P2 of the object TG in the left-right direction is detected by the second position detecting section 57 (S121). Then, the second average value AP2 which is an average value, within the predetermined time period (for example, 0.2 sec), of the position P2 in the left-right direction detected in step S121 and the second distribution SP2 which is distribution of the position P2 in the left-right direction within the predetermined time period (for example, 0.2 sec) are calculated by the second position correcting section 58 (S123). Then, the second corrected position P2A is obtained by the second position correcting section 58 by subtracting, from the second average value AP2 calculated in step S123, a product which is obtained by multiplying the second distribution SP2 calculated in step S123 by the second predetermined number K2 set in step S119 (S125), and the process is ended.

As described above, by shifting in the up-down direction some of the plurality of element antennas 21, 22, and 23 which are included in the receive antenna 2 and disposed in the left-right direction, from the others, the position P1 of the object TG in the up-down direction can be detected based on the phase difference between the respective reception signals received by the plurality of element antennas 21, 22, and 23. Also, the position P1 in the up-down direction is corrected based on the history of the obtained position P1 in the up-down direction, and thereby the first corrected position P1A which is the position in the up-down direction after the correction is obtained. Therefore, the position of the object TG in the up-down direction can accurately be detected.

Furthermore, the position P2 of the object TG in the left-right direction can be obtained based on the phase difference between the respective reception signals received by the plurality of element antennas 21, 22, and 23 disposed in the left-right direction. Also, the position P2 in the left-right direction is corrected based on the history of the obtained position P2 in the left-right direction, and thereby the second corrected position P2A which is the position in the left-right direction after the correction is obtained. Therefore, the position of the object TG in the left-right direction can accurately be detected.

The radar device 100 according to the present invention is not limited to the above-described embodiment, and may in any of configurations as described below.

(A) While, in the present embodiment, the case is described where the position detecting ECU 5 functionally includes the first image generating section 51, the first characteristic estimating section 52, the first position detecting section 53, the first position correcting section 54, the second image generating section 55, the second characteristic estimating section 56, the second position detecting section 57, the second position correcting section 58, and the like, at least one function part among the following: the first image generating section 51; the first characteristic estimating section 52; the first position detecting section 53; the first position correcting section 54; the second image generating section 55; the second characteristic estimating section 56; the second position detecting section 57; and the second position correcting section 58, may be realized in a form of hardware, such as electric circuitry.

(B) While, in the present embodiment, the case is described where the radar device 100 detects the object TG in front of the vehicle VR, the radar device 100 may detect objects around the vehicle VR. For example, the radar device 100 may detect an object present behind the vehicle VR, or the radar device 100 may detect an object present to a side of the vehicle VR.

(C) While, in the present embodiment, the case is described where the radar device 100 detects the distance to the object TG and the relative speed by applying the DBF processing on the FM-CW system, the radar device 100 may detect the distance to the object TG and the relative speed by another method (for example, monopulse method and the like).

(D) While, in the present embodiment, the case is described where the radar device 100 obtains the positions of the object TG in the up-down and left-right directions by the phase monopulse method, the radar device 100 may detect the positions of the object TG in the up-down and left-right directions, based on the phase difference between the respective reception signals received by the plurality of element antennas 21, 22, and 23.

(E) While, in the present embodiment, the case is described where the radar device 100 includes the three element antennas 21, 22, and 23, the radar device 100 may include any number of element antennas. For example, the radar device 100 may include two element antennas, or four or more element antennas.

INDUSTRIAL APPLICABILITY

The present invention is applicable to radar devices, which are, for example, mounted in a vehicle and detect a position of an object present around the vehicle in the up-down direction. The present invention is also applicable to radar devices, which are, for example, mounted in a vehicle and detect a position of an object present around the vehicle in the left-right direction.

DESCRIPTION OF THE REFERENCE CHARACTERS

100 radar device
1 transmit antenna
2 receive antenna
21 first element antenna (part of a plurality of element antennas)
22 second element antenna (part of the plurality of element antennas)
23 third element antenna (part of the plurality of element antennas)
3 oscillator
4 mixing section
41 first mixer
42 second mixer
43 third mixer
5 position detecting ECU
51 first image generating section (part of first image generator)
52 first characteristic estimating section (first characteristic estimator)
53 first position detecting section (first position detector)
54 first position correcting section (first position corrector)
55 second image generating section (part of second image generator)
56 second characteristic estimating section (second characteristic estimator)
57 second position detecting section (second position detector)
58 second position correcting section (second position corrector)
6 camera (part of the first image generator, part of the second image generator)

The invention claimed is:

1. A radar device, which is mounted in a vehicle, for detecting a position, in the up-down direction, of an object present around the vehicle, the radar device comprising:
a receive antenna having a plurality of element antennas which are disposed in the left-right direction such that at least some of the plurality of element antennas are shifted in the up-down direction from the others;
a first position detector for detecting the position of the object in the up-down direction, based on a phase difference between respective reception signals received by the plurality of element antennas; and
a first position corrector for correcting the position in the up-down direction, based on a history, within a previously set predetermined time period, of variation of the position in the up-down direction which is obtained by the first position detector, and obtaining a first corrected position, which is a position in the up-down direction after the correction, the variation being caused by reflected waves, which are generated by a radar wave being reflected by the object, arriving at the receive antenna through a plurality of paths including a road surface reflection path and a synthesized wave of the reflected waves which arrived through the plurality of paths being received at the receive antenna.

2. The radar device according to claim 1, wherein the first position corrector obtains a substantially uppermost position as the first corrected position, among positions in the up-down direction which have been detected within a previously set predetermined time period.

3. The radar device according to claim 1, wherein the first position corrector obtains a first average value, which is an average value of positions in the up-down direction which have been detected within a previously set predetermined time period, and first distribution, which is distribution of the positions in the up-down direction within the previously set predetermined time period, and obtains the first corrected position, based on the obtained first average value and the obtained first distribution.

4. The radar device according to claim 3, wherein the first position corrector obtains the first corrected position by adding, to the first average value, a product which is obtained by multiplying the first distribution by a first predetermined number, which is previously set, that is equal to or greater than 1.

5. The radar device according to claim 4, wherein the first predetermined number is set to be equal to or greater than 2 and equal to or less than 4.

6. The radar device according to claim 1, comprising
first characteristic estimator for estimating a first reflectance characteristic of a radio wave transmitted from the radar device, the first reflectance characteristic being a reflectance characteristic in a road surface on which the vehicle travels, wherein
the first position corrector obtains the first corrected position, based on the first reflectance characteristic estimated by the first characteristic estimator.

7. The radar device according to claim 6, comprising
first image generator for generating image information on the road surface on which the vehicle travels, wherein
the first characteristic estimator estimates the first reflectance characteristic, based on the image information, on the road surface, which is generated by the first image generator.

8. The radar device according to claim 1, comprising:
a second position detector for obtaining a position of the object in the left-right direction, based on the phase difference between the respective reception signals received by the plurality of element antennas; and
a second position corrector for correcting the position, in the left-right direction, which is obtained by the second position detector, based on a history, within a previously set predetermined time period, of variation of the position in the left-right direction which is obtained by the second position detector, and obtaining a second corrected position, which is a position in the left-right direction after the correction the variation being caused by reflected waves, which are generated by a radar wave being reflected by the object, arriving at the receive antenna through a plurality of paths including a side wall reflection path and a synthesized wave of the reflected waves which arrived through the plurality of paths being received at the receive antenna.

9. A radar device, which is mounted in a vehicle, for detecting a position, in the left-right direction, of an object present around the vehicle, the radar device comprising:
a receive antenna having a plurality of element antennas disposed in the left-right direction;
a position detector for obtaining the position of the object in the left-right direction, based on a phase difference between respective reception signals received by the plurality of element antennas; and
a position corrector for correcting the position in the left-right direction, which is obtained by the position detector, based on a history, within a previously set predetermined time period, of variation of the position in the left-right direction, which is obtained by the position detector, and obtaining a corrected position, which is a position in the left-right direction after the correction, the variation being caused by reflected waves, which are generated by a radar wave being reflected by the object, arriving at the receive antenna through a plurality of paths including a side wall reflection path and a synthesized wave of the reflected waves which arrived through the plurality of paths being received at the receive antenna.

10. The radar device according to claim 9,
wherein the position corrector obtains a substantially front most position as the corrected position, among positions in the left-right direction which have been detected within a previously set predetermined time period.

11. The radar device according to claim 9, wherein the position corrector obtains an average value of positions in the left-right direction which have been detected within the previously set predetermined time period, and distribution of the positions in the left-right direction within the previously set predetermined time period, and obtains the corrected position, based on the obtained average value and the obtained distribution.

12. The radar device according to claim 11, wherein the position corrector obtains the corrected position by subtracting from the average value a product which is obtained by multiplying the second distribution by a predetermined number, which is previously set, that is equal to or greater than 1.

13. The radar device according to claim 12, wherein the predetermined number is set to be equal to or greater than 2 and equal to or less than 4.

14. The radar device according to claim 9, further comprising:
a characteristic estimator for estimating a reflectance characteristic of a radio wave transmitted from the radar device, the reflectance characteristic being a reflectance characteristic in a side wall on a road on which the vehicle travels, wherein
the position corrector obtains the corrected position, based on the reflectance characteristic estimated by the characteristic estimator.

15. The radar device according to claim 14, comprising:
an image generator for generating image information on the side wall on the road on which the vehicle travels, wherein
the characteristic estimator estimates the reflectance characteristic, based on the image information, on the side wall, which is generated by the image generator.

16. The radar device according to claim 9, wherein
the plurality of element antennas are disposed such that at least some of the plurality of element antennas are shifted in the up-down direction from the others,
the radar device comprising:
another position detector for obtaining a position of the object in the up-down direction, based on the phase difference between the respective reception signals received by the plurality of element antennas; and
another position corrector for correcting the position in the up-down direction, based on a history, within a previously set predetermined time period, of variation of the position in the up-down direction which is obtained by the another position detector, and obtaining another corrected position, which is a position in the up-down direction after the correction, the variation being caused by reflected waves, which are generated by a radar wave being reflected by the object, arriving at the receive antenna through a plurality of paths including a road surface reflection path and a synthesized wave of the reflected waves which arrived through the plurality of paths being received at the receive antenna.

* * * * *